United States Patent
Roundy et al.

(10) Patent No.: US 10,169,584 B1
(45) Date of Patent: Jan. 1, 2019

(54) SYSTEMS AND METHODS FOR IDENTIFYING NON-MALICIOUS FILES ON COMPUTING DEVICES WITHIN ORGANIZATIONS

(71) Applicant: Symantec Corporation, Mountain View, CA (US)

(72) Inventors: Kevin Roundy, El Segundo, CA (US); Sandeep Bhatkar, Sunnyvale, CA (US); Aleatha Parker-Wood, Palo Alto, CA (US); Yin Liu, Sunnyvale, CA (US); Anand Kashyap, Los Altos, CA (US); Leylya Yumer, Antibes (FR); Christopher Gates, Culver City, CA (US)

(73) Assignee: Symantec Corporation, Mountain View, CA (US)

( * ) Notice: Subject to any disclaimer, the term of this patent is extended or adjusted under 35 U.S.C. 154(b) by 296 days.

(21) Appl. No.: 14/750,342

(22) Filed: Jun. 25, 2015

(51) Int. Cl.
   *G06F 21/56* (2013.01)
   *G06F 21/57* (2013.01)
   *H04L 29/06* (2006.01)

(52) U.S. Cl.
   CPC ........... *G06F 21/566* (2013.01); *G06F 21/57* (2013.01); *H04L 63/101* (2013.01); *H04L 63/20* (2013.01); *G06F 2221/034* (2013.01)

(58) Field of Classification Search
   CPC ........ G06F 21/566; G06F 21/50; G06F 21/51; G06F 21/56–21/568; G06F 21/577; G06F 2221/033; H04L 63/10–63/101; H04L 63/1408–63/1425; H04L 63/1433; H04L 63/1441–63/145; H04L 63/20–63/205
   See application file for complete search history.

(56) References Cited

U.S. PATENT DOCUMENTS

| | | |
|---|---|---|
| 7,352,280 B1 | 4/2008 | Rockwood |
| 8,214,905 B1 | 7/2012 | Doukhvalov et al. |
| 8,839,435 B1 | 9/2014 | King |
| 9,098,706 B1 * | 8/2015 | Kennedy ............... H04L 9/3263 |
| 9,270,467 B1 | 2/2016 | Chen et al. |
| 9,413,780 B1 | 8/2016 | Kaplan et al. |
| 9,485,272 B1 | 11/2016 | Roundy |
| 9,792,169 B2 | 10/2017 | Seigel |
| 9,838,405 B1 | 12/2017 | Guo et al. |

(Continued)

OTHER PUBLICATIONS

Kevin Alejandro Roundy, et al; Systems and Methods for Detecting Security Threats; U.S. Appl. No. 15/084,522, filed Mar. 30, 2016.

(Continued)

*Primary Examiner* — Kevin Bechtel
(74) *Attorney, Agent, or Firm* — Fisher Broyles, LLP

(57) ABSTRACT

The disclosed computer-implemented method for identifying non-malicious files on computing devices within organizations may include (1) identifying a file on at least one computing device within multiple computing devices managed by an organization, (2) identifying a source of the file based on examining a relationship between the file and the organization, (3) determining that the source of the file is trusted within the organization, and then (4) concluding, based on the source of the file being trusted within the organization, that the file is not malicious. Various other methods, systems, and computer-readable media are also disclosed.

16 Claims, 6 Drawing Sheets

(56) References Cited

U.S. PATENT DOCUMENTS

| | | | |
|---|---|---|---|
| 2002/0083070 A1* | 6/2002 | Shuster | G06F 21/6218 |
| 2005/0283837 A1 | 12/2005 | Olivier et al. | |
| 2006/0230451 A1* | 10/2006 | Kramer | G06F 21/56 726/22 |
| 2006/0242712 A1* | 10/2006 | Linn | G06F 21/56 726/26 |
| 2006/0253548 A1* | 11/2006 | Vitanov | G06F 9/45537 709/217 |
| 2007/0240217 A1 | 10/2007 | Tuvell et al. | |
| 2008/0086772 A1 | 4/2008 | Chesla | |
| 2009/0089290 A1* | 4/2009 | Nachenberg | G06F 21/51 |
| 2009/0217370 A1* | 8/2009 | Hulten | G06F 21/51 726/16 |
| 2010/0083376 A1 | 4/2010 | Pereira et al. | |
| 2010/0228852 A1 | 9/2010 | Gemelos et al. | |
| 2012/0233698 A1 | 9/2012 | Watters et al. | |
| 2013/0074143 A1 | 3/2013 | Bu et al. | |
| 2014/0096246 A1 | 4/2014 | Morrissey et al. | |
| 2014/0157350 A1* | 6/2014 | Wang | G06F 21/604 726/1 |
| 2014/0165203 A1* | 6/2014 | Friedrichs | G06F 21/56 726/24 |
| 2014/0223566 A1 | 8/2014 | Zaitsev | |
| 2014/0283066 A1* | 9/2014 | Teddy | G06F 21/56 726/23 |
| 2015/0074806 A1 | 3/2015 | Roundy et al. | |
| 2015/0128263 A1 | 5/2015 | Raugas et al. | |
| 2015/0207813 A1 | 7/2015 | Reybok et al. | |
| 2015/0372976 A1 | 12/2015 | Lonas et al. | |
| 2016/0072836 A1 | 3/2016 | Hadden et al. | |
| 2016/0080400 A1* | 3/2016 | Sim | H04L 63/1416 726/23 |
| 2016/0292419 A1 | 10/2016 | Langton et al. | |

OTHER PUBLICATIONS

"Association rule learning", https://en.wikipedia.org/wiki/Association_rule_learning, as accessed Mar. 2, 2016, Wikipedia, (Apr. 15, 2005).

Kevin Alejandro Roundy; Systems and Methods for Estimating Confidence Scores of Unverified Signatures; U.S. Appl. No. 14/307,477, filed Jun. 18, 2014.

Kuang, Liwei (Vivian), "DNIDS: A Dependable Network Intrusion Detection System Using the CSI-KNN Algorithm", https://qspace.library.queensu.ca/bitstream/1974/671/2/Kuang_Liwei_200709_MSc.pdf, as accessed Apr. 25, 2014, A thesis submitted to the School of Computing in conformity with the requirements for the degree of Master of Science, Queen's University, Kingston, Ontario, Canada, (Sep. 2007).

Yu, Dong et al., "Alert Confidence Fusion in Intrusion Detection Systems with Extended Dempster-Shafer Theory", http://citeseerx.ist.psu.edu/viewdoc/download;jsessionid=FF6509FDC7A1D361CA4AFC293FA41159?doi=10.1.1.188.1103&rep=rep1&type=pdf, as accessed Apr. 25, 2014, 43rd ACM Southeast Conference, Kennesaw, GA, USA, (Mar. 18-20, 2005).

"ArcSight", http://www8.hp.com/us/en/software-solutions/arcsight-express-siem-appliance/tech-specs.html?jumpid=reg_r1002_usen_c-001_title_r0002, as accessed Apr. 25, 2014, Hewlett-Packard Development Company, L.P., (2014).

Fanglu Guo, et al.; Systems and Methods for Determining Types of Malware Infections on Computing Devices; U.S. Appl. No. 14/947,878, filed Nov. 20, 2015.

"Managed Security Services", http://www.symantec.com/managed-security-services/, as accessed Sep. 21, 2015, Symantec Corporation, (On or before Sep. 21, 2015).

"Naive Bayes classifier", https://en.wikipedia.org/wiki/Naive_Bayes_classifier, as accessed Sep. 21, 2015, Wikipedia, (Jan. 31, 2005).

"Probabilistic classification", https://en.wikipedia.org/wiki/Probabilistic_classification, as accessed Sep. 21, 2015, Wikipedia, (Aug. 7, 2014).

Lord, Nate, "Common Malware Types: Cybersecurity 101", https://www.veracode.com/blog/2012/10/common-malware-types-cybersecurity-101, as accessed Sep. 21, 2015, Veracode, (Oct. 12, 2012).

Kevin Roundy, et al.; Systems and Methods for Determining the Trustworthiness of Files Within Organizations; U.S. Appl. No. 14/753,051, filed Jun. 29, 2015.

"Stack Overflow", http://stackoverflow.com/, as accessed May 13, 2015, Stack Exchange Inc., (Mar. 1, 2000).

"Yelp", http://www.yelp.com/, as accessed May 13, 2015, (Nov. 28, 1996).

Chris Gates, et al; Systems and Methods for Detecting Security Blind Spots; U.S. Appl. No. 15/266,320, filed Sep. 15, 2016.

ArcSight; http://www8.hp.com/us/en/software-solutions/arcsight-express-siem-appliance/tech-specs.html?jumpid=reg_r1002_usen_c-001_title_r0002, as accessed Apr. 25, 2014; Hewlett-Packard Development Company, L.P., 2004.

Chris Gates et al.; Systems and Methods for Personalizing Security Incident Reports; U.S. Appl. No. 15/292,874, filed Oct. 13, 2016.

Suleiman Yerima et al., A New Android Harare Detection Approach Using Bayesian Classification, IEEE, 2013.

* cited by examiner

SYSTEMS AND METHODS FOR IDENTIFYING NON-MALICIOUS FILES ON COMPUTING DEVICES WITHIN ORGANIZATIONS

BACKGROUND

Organizations often deploy a variety of anti-malware and/or file-filtering technologies in order to prevent potentially malicious files from infecting or being installed on computing devices within the organizations. Such technologies may effectively identify spam, adware, viruses, Trojan horses, and other undesirable files that originate from sources external to organizations. For example, traditional anti-malware software may analyze incoming files for code patterns associated with known malware distributors.

Unfortunately, some anti-malware technologies may be unable to accurately and/or efficiently analyze files that originate from within and/or are otherwise associated with an organization. For example, conventional anti-malware technology may determine that files created by members of an organization are potentially malicious because the files are not created by an established, trusted source. As such, the anti-malware technology may prevent computing devices within the organization from efficiently accessing the files. In some cases, users within an organization may even disable anti-malware programs in the event that the programs are too disruptive to their workflow. Therefore, the instant disclosure identifies and addresses a need for improved systems and methods for identifying non-malicious files within organizations.

SUMMARY

As will be described in greater detail below, the instant disclosure describes various systems and methods for identifying non-malicious files on computing devices within organizations by identifying a source of a file based on a relationship between the file and an organization. The various systems and methods described herein may then determine that the file is non-malicious by determining that the source of the file is trusted within the organization.

In one example, a computer-implemented method for identifying non-malicious files on computing devices within organizations may include (1) identifying a file on at least one computing device within multiple computing devices managed by an organization, (2) identifying a source of the file based on examining a relationship between the file and the organization, (3) determining that the source of the file is trusted within the organization, and then (4) concluding, based on the source of the file being trusted within the organization, that the file is not malicious. In some embodiments, the method may further include, in response to concluding that the file is not malicious, adding the file to a whitelist that identifies files allowed to be accessed by the multiple computing devices managed by the organization.

In some examples, identifying the file on the computing device may include detecting an attempt by a user of the computing device to install and/or download the file onto the computing device. Additionally or alternatively, identifying the file on the computing device may include detecting an attempt by a user of the computing device to execute the file on the computing device.

In some embodiments, identifying the source of the file may include identifying a user within the organization that created the file. In such embodiments, determining that the source of the file is trusted may include determining that the user is an administrator within the organization. In some examples, determining that the user is the administrator may include, prior to identifying the file on the computing device, creating a profile for the administrator that identifies applications associated with a computing device of the administrator. The method may then include determining that the file was generated by an application within the profile.

In some examples, identifying the source of the file may include analyzing files on the multiple computing devices managed by the organization to identify instances of the file on the multiple computing devices. In these examples, determining that the source of the file is trusted may include identifying an instance of the file on at least a certain number of computing devices within the multiple computing devices.

In some embodiments, identifying the source of the file may include (1) determining that an instance of the file appeared on at least one additional computing device within the multiple computing devices managed by the organization and (2) determining a time at which the instance of the file appeared on the additional computing device. In such embodiments, determining that the source of the file is trusted may include determining that the instance of the file appeared on the additional computing device within a certain amount of time of identifying the file on the computing device.

In some examples, identifying the source of the file may include determining that the file originated from a database of files managed by the organization. In these examples, determining that the source of the file is trusted may include determining that the database of files managed by the organization is trusted.

In some embodiments, identifying the source of the file may include determining that the file was generated by a software distributor external to the organization. In such embodiments, determining that the source of the file is trusted may include determining that the software distributor is trusted.

In some examples, identifying the source of the file may include querying multiple users within the organization for an indication of the trustworthiness of the file. In these examples, determining that the source of the file is trusted may include determining that at least a certain number of users within the organization indicate that the file is trustworthy.

In one embodiment, a system for implementing the above-described method may include (1) an identification module that (A) identifies a file on at least one computing device within multiple computing devices managed by an organization and (B) identifies a source of the file based on examining a relationship between the file and the organization, (2) a determination module that determines that the source of the file is trusted within the organization, and (3) a conclusion module that concludes, based on the source of the file being trusted within the organization, that the file is not malicious. The system may also include at least one physical processor configured to execute the identification module, the determination module, and the conclusion module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) identify a file on at least one computing device within multiple computing devices managed by an organization, (2) identify a source of the file based on examining a relationship between the file and the organization, (3) determine that the source of the file is trusted within the organization, and then (4) conclude, based on the source of the file being trusted within the organization, that the file is not malicious.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
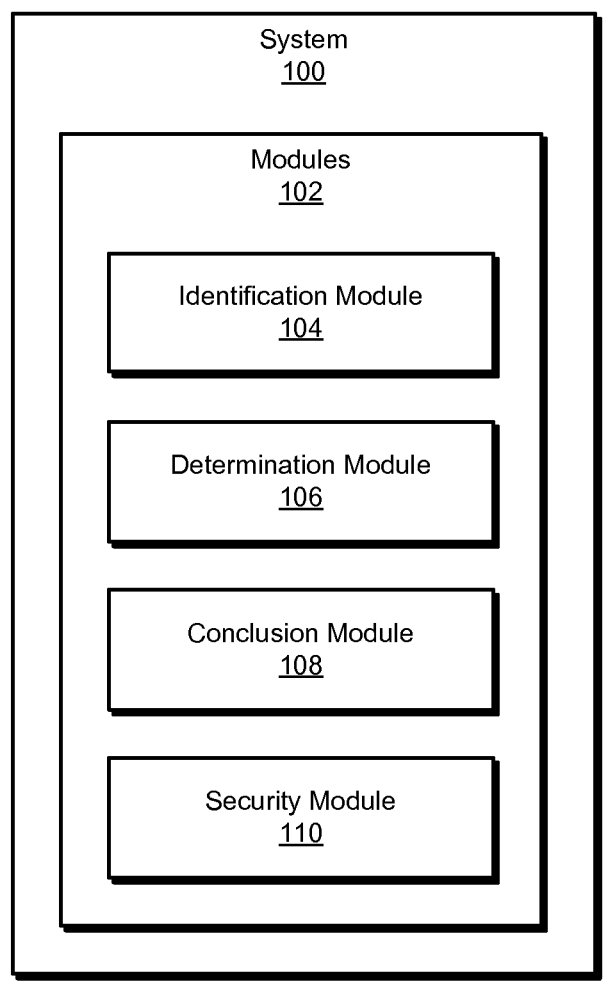
FIG. 1 is a block diagram of an exemplary system for identifying non-malicious files on computing devices within organizations.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for identifying non-malicious files on computing devices within organizations. As will be explained in greater detail below, by examining a relationship between a file identified within an organization and the organization, the disclosed systems and methods may determine whether the source of the file is trusted within the organization. For example, the systems and methods described herein may determine that a file was created by a trusted member of an organization and/or that the file is part of an organization-wide software update. By identifying files that originate from sources trusted by an organization, the disclosed systems and methods may accurately identify benign and/or organization-specific files that may otherwise be incorrectly classified as unknown or potentially malicious.

Figure 2:
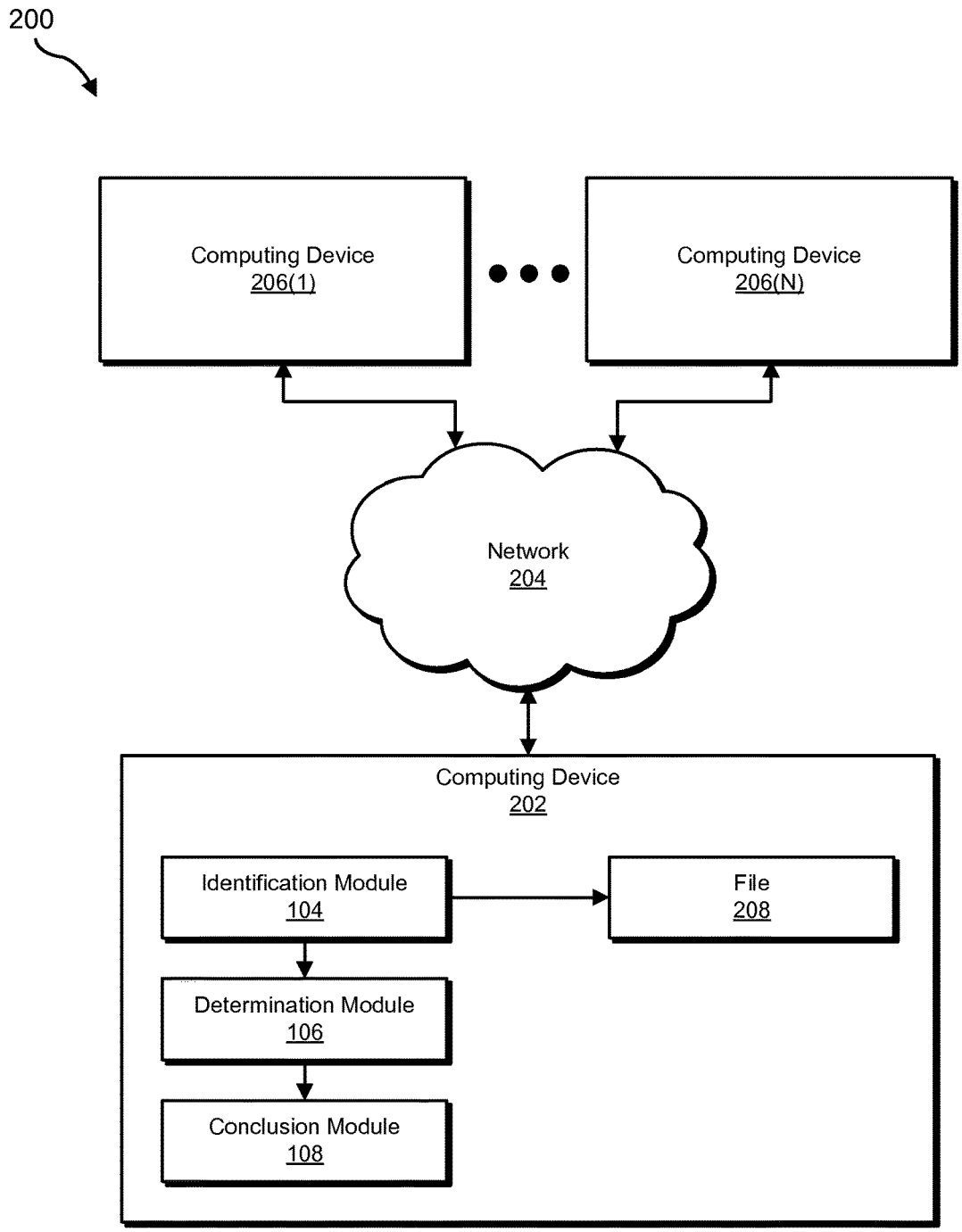
FIG. 2 is a block diagram of an additional exemplary system for identifying non-malicious files on computing devices within organizations.

The following will provide, with reference to FIGS. 1 and 2, detailed descriptions of exemplary systems for identifying non-malicious files on computing devices within organizations. Detailed descriptions of corresponding computer-implemented methods will also be provided in connection with FIG. 3. In addition, detailed descriptions of computing devices managed by an organization will be provided in connection with FIG. 4. Finally, detailed descriptions of an exemplary computing system and network architecture capable of implementing one or more of the embodiments described herein will be provided in connection with FIGS. 5 and 6, respectively.

FIG. 1 is a block diagram of an exemplary system 100 for identifying non-malicious files on computing devices within organizations. As illustrated in this figure, exemplary system 100 may include one or more modules 102 for performing one or more tasks. For example, and as will be explained in greater detail below, exemplary system 100 may include an identification module 104 that (1) identifies a file on at least one computing device within multiple computing devices managed by an organization and (2) identifies a source of the file based on examining a relationship between the file and the organization. Exemplary system 100 may also include a determination module 106 that determines that the source of the file is trusted within the organization.

In addition, and as will be described in greater detail below, exemplary system 100 may include a conclusion module 108 that concludes, based on the source of the file being trusted within the organization, that the file is not malicious. Finally, exemplary system 100 may include a security module 110 that adds the file to a whitelist of allowed files in response to the conclusion that the file is not malicious. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or computing devices 206 (1)-(N)), computing system 510 in FIG. 5, and/or portions of exemplary network architecture 600 in FIG. 6. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with computing devices 206(1)-(N) via a network 204. In the example of FIG. 2, computing device 202 may be programmed with one or more of modules 102. Additionally or alternatively, computing devices 206(1)-(N) may be programmed with one or more of modules 102.

In one embodiment, one or more of modules 102 from FIG. 1 may, when executed by at least one processor of computing device 202, enable computing device 202 to identify non-malicious files on computing devices within organizations. For example, and as will be described in greater detail below, identification module 104 may cause computing device 202 to identify a file (e.g., file 208) on at least one computing device (e.g., computing device 202)

within multiple computing devices (e.g., computing device 202 and computing device 206(1)-(N)) managed by an organization. In addition, identification module 104 may cause computing device 202 to identify a source of file 208 based on examining a relationship between file 208 and the organization. Next, determination module 106 may cause computing device 202 to determine that the source of file 208 is trusted within the organization. Finally, conclusion module 108 may cause computing device 202 to conclude, based on the source of file 208 being trusted within the organization, that file 208 is not malicious.

Computing device 202 and computing devices 206(1)-(N) generally represent any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, application servers and database servers configured to provide various database services and/or run certain software applications, exemplary computing system 510 in FIG. 5, or any other suitable computing device.

In some embodiments, computing device 202 and computing devices 206(1)-(N) may represent computing devices managed by a single organization. The term "organization," as used herein, generally refers to any group or set of individuals that share any type or form of association or connection. Examples of organizations include, without limitation, businesses, enterprises, companies, schools, non-profit organizations, clubs, teams, members of online forums, individuals who subscribe to certain online services, combinations or one or more of the same, variations of one or more of the same, and/or any additional type of organization.

In one example, computing device 202 and/or computing devices 206(1)-(N) may represent personal computing devices assigned to and/or managed by individual members of an organization. Additionally or alternatively, one or more of computing device 202 and computing devices 206(1)-(N) may represent servers and/or databases configured to store and/or analyze files identified within an organization. In an exemplary embodiment, at least a portion of the systems described herein may be installed on each of computing device 202 and computing devices 206(1)-(N) as part of an organization-wide anti-malware program. For example, all or a portion of computing device 202 and computing devices 206(1)-(N) may be configured with identification module 104 in order to detect each file accessed by the computing devices. A central server or database, in communication with computing device 202 and computing devices 206(1)-(N), may host determination module 106 and/or conclusion module 108 in order to analyze the trustworthiness of each file identified by computing device 202 and/or computing devices 206(1)-(N).

Network 204 represents any medium or architecture capable of facilitating communication or data transfer. In some embodiments, computing devices 202 and/or computing devices 206(1)-(N) may be in communication with one another via network 204. In one example, network 204 may represent a private and/or local network configured by an organization that manages computing device 202 and computing devices 206(1)-(N). Additionally or alternatively, network 204 may provide computing devices 202 and/or computing devices 206(1)-(N) access to online services and networks external to the organization. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 600 in FIG. 6, or the like. Network 204 may facilitate communication or data transfer using wireless or wired connections.

Figure 3:
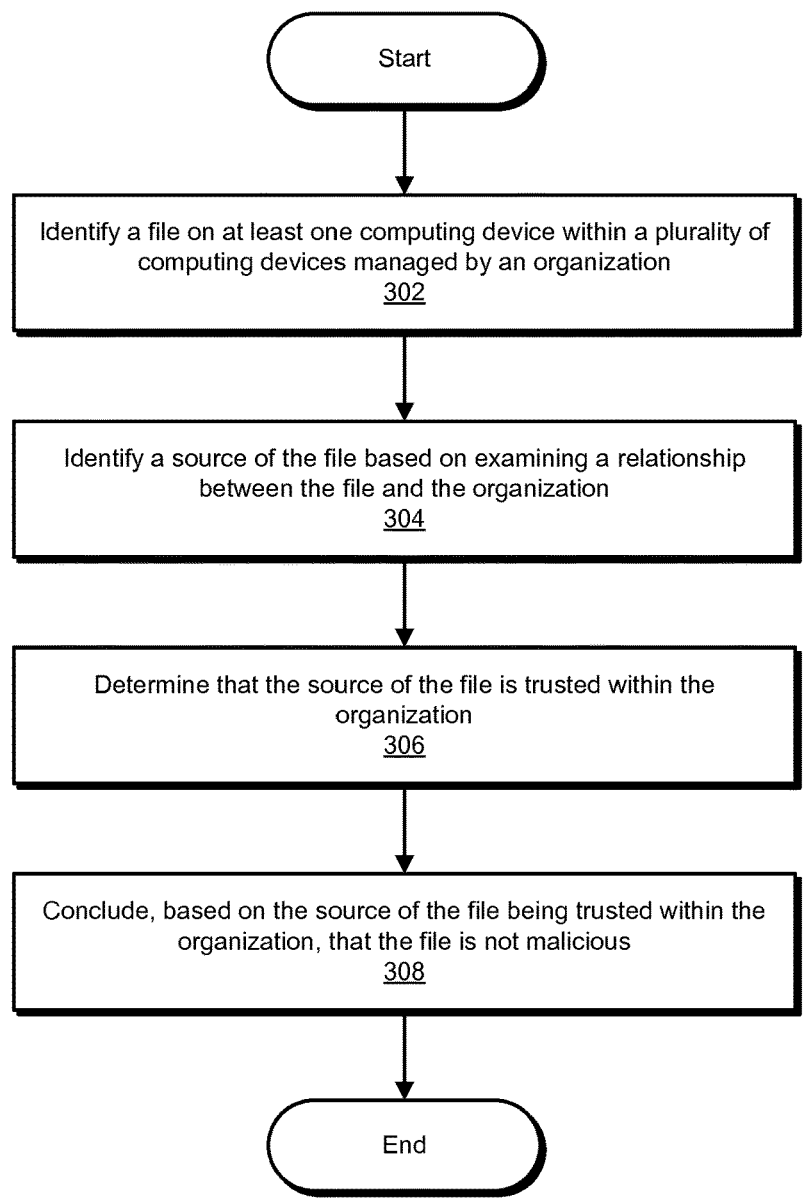
FIG. 3 is a flow diagram of an exemplary method for identifying non-malicious files on computing devices within organizations.

FIG. 3 is a flow diagram of an exemplary computer-implemented method 300 for identifying non-malicious files on computing devices within organizations. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302 one or more of the systems described herein may identify a file on at least one computing device within multiple computing devices managed by an organization. For example, identification module 104 may, as part of computing device 202 in FIG. 2, identify file 208 on computing device 202.

The term "file," as used herein, generally refers to any type or form of formatted portion of data or executable code. Examples of files include, without limitation, text files, image files, executable files, audiovisual files, compressed files, data files, database files, combinations of one or more of the same, variations of one or more of the same, and/or any additional type of file.

The systems described herein may identify a file on a computing device in a variety of ways. In some examples, identification module 104 may identify file 208 while monitoring computing device 202 for any indication that computing device 202 is accessing a new and/or unfamiliar file. For example, identification module 104 may detect all or a portion of the attempts made by a user of computing device 202 to install, download, upload, transfer, store, save, and/or execute files on computing device 202. In these examples, identification module 104 may identify file 208 on computing device 202 before file 208 has an opportunity to alter the configuration of computing device 202. In this way, the systems described herein may verify the trustworthiness of file 208 before file 208 is able to potentially compromise the safety and/or security of computing device 202.

In other examples, identification module 104 may identify file 208 after file 208 has been installed, downloaded, and/or executed on computing device 202. In these examples, identification module 104 may identify file 208 while analyzing existing files on computing device 202. For example, identification module 104 may periodically (e.g., every week, every month, etc.) examine the files on computing device 202 (as well as files on computing devices 206(1)-(N)) for any indication that the existing files may be malicious.

Returning to FIG. 3, at step 304 one or more of the systems described herein may identify a source of the file based on examining a relationship between the file and the organization. For example, identification module 104 may, as part of computing device 202 in FIG. 2, identify a source of file 208 based on examining a relationship between file 208 and the organization that manages computing device 202.

The term "source of a file," as used herein, generally refers to any type or form of location or entity associated with creating, generating, and/or distributing a file. In some examples, a source of a file may refer to a physical region or area in which the file was created. In other examples, a source of a file may refer to a computing device or set of computing devices on which the file was created. Additionally or alternatively, a source of a file may refer to an individual and/or organization responsible for creating the file. Moreover, a source of a file may not necessarily refer to an initial point of origin of a file (e.g., a source responsible for first creating the file). Instead, a source of a file may refer to an intermediary location of the file associated with transferring the file from its point of origin to certain destinations. For example, a source of a file may refer to a computing device within an organization that downloads the file from an online service and distributes the file to additional computing devices within the organization. Additionally or alternatively, the source of file 208 may be an aggregate source including each of the computing devices on which file 208 is found.

In addition, the term "relationship between a file and an organization," as used herein, generally refers to any type or form of connection, association, or affiliation between a file and an organization. A relationship between a file and an organization may indicate a point of origin of the file within the organization, a frequency with which the file appears within the organization, a reputation of the file within the organization, and/or any additional connection between the file and the organization.

The systems described herein may identify a source of a file in a variety of ways. In some examples, identification module 104 may identify the source of file 208 based on an analysis of the contents of file 208 and/or metadata associated with file 208. For example, identification module 104 may search file 208 for an indication of an individual or user responsible for creating file 208. Additionally or alternatively, identification module 104 may identify the source of file 208 based on an interaction between file 208 and computing device 202. For example, identification module 104 may analyze an installer application and/or a messaging application within computing device 202 that handles file 208. Furthermore, in some examples, identification module 104 may identify the source of file 208 by querying resources beyond computing device 202, such as users and/or databases of files within the organization that manages computing device 202.

In some embodiments, identification module 104 may determine that the source of file 208 is within the organization that manages computing device 202. For example, identification module 104 may determine that a specific user, set of users, and/or department within the organization created file 208. As another example, identification module 104 may determine that file 208 originated from a database of files managed by the organization. In these embodiments, identification module 104 may determine that file 208 has a proprietary or internal relationship with the organization.

In other embodiments, identification module 104 may determine that the source of file 208 is external to the organization that manages computing device 202. For example, identification module 104 may determine that file 208 was generated by an external software distributor and/or originated from a database not managed by the organization. In these embodiments, identification module 104 may determine that file 208 has an external or independent relationship with the organization.

In some examples, identification module 104 may identify the source of file 208 at least in party by querying multiple users for information about file 208. For example, in response to identifying file 208 on computing device 202, identification module 104 may distribute all or a portion of file 208 to one or more users of computing devices 206(1)-(N). Identification module 104 may then prompt the users to analyze file 208 and return a variety of information based on the analysis, such as a source of file 208 and/or a trustworthiness of file 208. In these examples, identification module 104 may determine whether file 208 has a trusted or untrusted relationship with the organization based on the responses of the users within the organization.

In some embodiments, identification module 104 may identify the source of file 208 at least in part by identifying file 208 on multiple computing devices within the organization. For example, after identifying file 208 on computing device 202, identification module 104 may query computing devices 206(1)-(N) to obtain a list of files currently stored within and/or accessed by computing devices 206(1)-(N). In another example, identification module 104 may query a central database or server that is continually updated with files accessed by computing devices 206(1)-(N). In these examples, identification module 104 may determine whether file 208 has a widespread or limited relationship with the organization based on the prevalence of file 208 within the organization.

Furthermore, in some examples, identification module 104 may also determine a time at which each instance of file 208 appeared on the computing devices. For example, identification module 104 may determine whether each instance of file 208 appeared within the same week, the same day, or the same hour as file 208 appeared on computing device 202. In these examples, identification module 104 may determine whether file 208 has a new or established relationship with the organization.

Figure 4:
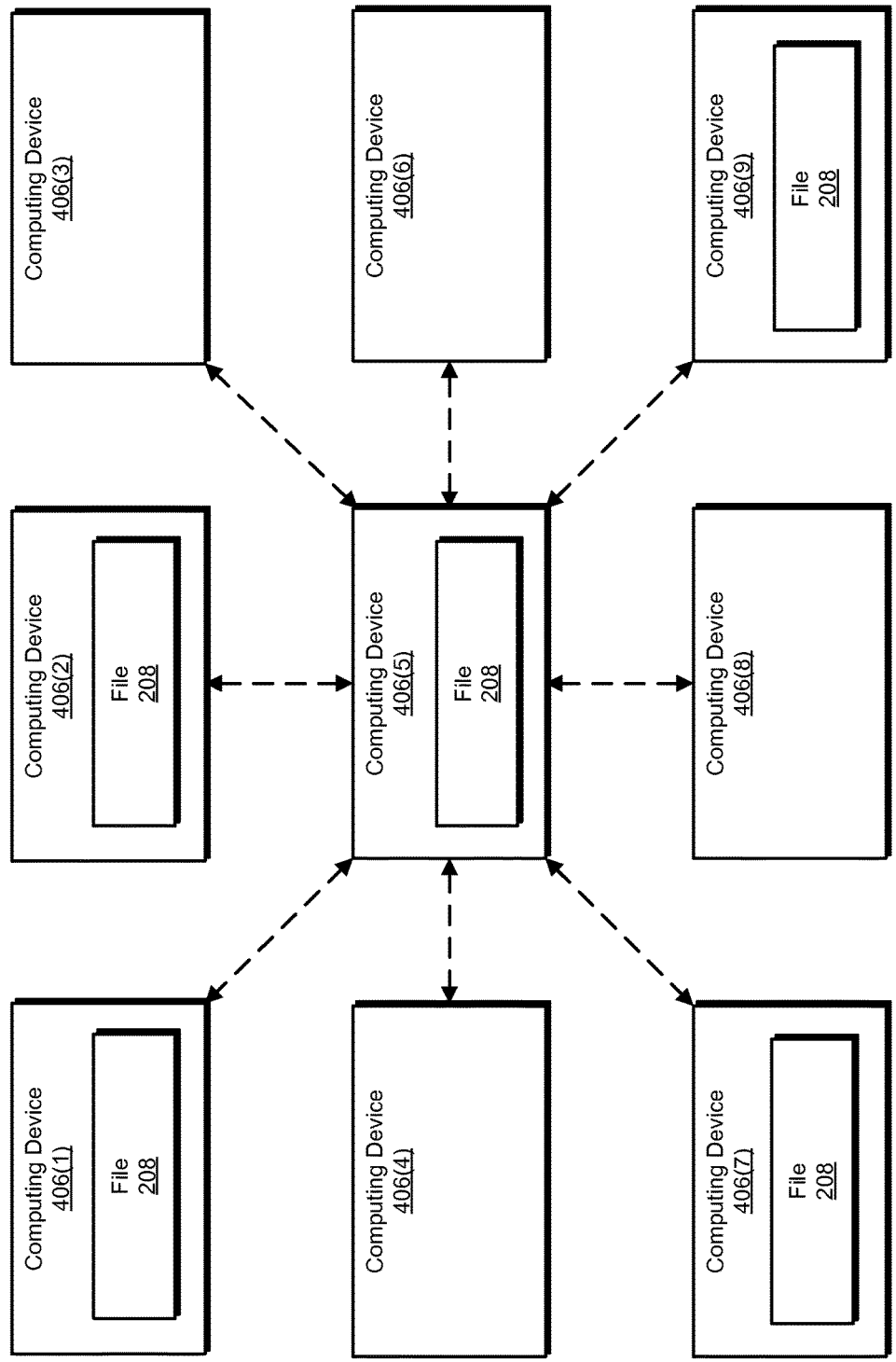
FIG. 4 is an illustration of exemplary computing devices managed by an organization.

As an example of multiple computing devices managed by an organization, FIG. 4 illustrates computing devices 406(1)-(9). In this example, computing devices 406(1)-(9) may represent individual computing devices in communication with one another via an internal network of an organization. In one example, identification module 104 may identify file 208 on computing device 406(5). In response, identification module 104 may analyze files on all or a portion of the remaining computing devices within the organization to identify any additional instances of file 208. In the example of FIG. 4, identification module 104 may determine that four computing devices (i.e., computing devices 406(1), 406(2), 406(7), and 406(9)) also contain and/or have accessed file 208. In some embodiments, identification module 104 may also determine a time and/or day during which each computing device accessed file 208.

Returning to FIG. 3, at step 306 one or more of the systems described herein may determine that the source of the file is trusted within the organization. For example, determination module 106 may, as part of computing device 202 in FIG. 2, determine that the source of file 208 is trusted within the organization that manages computing device 202.

The term "trusted source," as used herein, generally refers to any type or form of source that is known or determined to create, generate, and/or distribute non-malicious, benign, and/or legitimate files. In contrast, an "untrusted source," as used herein, generally refers to any type or form of source whose reputation cannot be verified and/or that is known to produce malicious files (e.g., viruses, worms, adware, spyware, Trojan horses, and other types of malware).

The systems described herein may determine that a source of a file is trusted in a variety of ways. In some examples, determination module 106 may determine that the source of file 208 is trusted based on the type of relationship between file 208 and the organization that manages computing device 202. For example, determination module 106 may determine that the source is trusted if file 208 has a "proprietary,"

"established," "widespread" or similar relationship with the organization. Conversely, determination module 106 may determine that a source of a file is untrusted in the event that the file has a relationship such as "independent," "new," or "limited," with an organization.

In some examples, in the event that identification module 104 identified a user within an organization who created file 208, determination module 106 may determine that file 208 is trusted by determining that the user is trusted within the organization. For example, determination module 106 may determine that the user is an administrator within the organization (e.g., a manager or an Information Technology (IT) specialist).

Determination module 106 may determine that a user is an administrator in any suitable manner. For example, determination module 106 may determine that the user who created file 208 signed or encrypted file 208 as an indication that file 208 was created by an administrator. In another example, determination module 106 may determine that the computing device that created file 208 belongs to an administrator. In this example, determination module 106 may have previously created profiles for one or more administrators within the organization by identifying certain applications associated with the computing devices of the administrators. Specifically, determination module 106 may have created profiles for each administrator that identify programs (such as compilers) that are used disproportionately or exclusively by the administrators. In response to file 208 being identified on computing device 202, determination module 106 may identify a program that was used to create file 208. In the event that the program used to create file 208 corresponds to a file on a profile of an administrator, determination module 106 may determine that file 208 was created by an administrator and therefore that the source of file 208 is trusted.

In other examples, in the event that identification module 104 identified a database of files within the organization that generated file 208, determination module 106 may determine that the source of file 208 is trusted by determining that the database is trusted and/or secure. For example, determination module 106 may determine that file 208 was transferred or delivered to computing device 202 from a local trusted repository that contains only files created and/or verified by members of the organization.

In further examples, in the event that identification module 104 identified an external software distributor that generated file 208, determination module 106 may determine that the source of file 208 is trusted by determining that the software distributor is trusted. For example, determination module 106 may identify the software distributor associated with file 208 on a list of trusted software distributors maintained by the organization. In another example, determination module 106 may determine that the software distributor associated with file 208 is a trusted authority that signed and/or encrypted file 208 with a secure, private encryption key associated with the software distributor.

In additional examples, determination module 106 may determine that the source of file 208 is trusted based at least in part on determining that file 208 is related to a file whose source was recently verified within the organization. For example, determination module 106 may determine that file 208 is dependent on and/or was generated by the same software distributor as another file previously identified within the organization. Determination module 106 may also determine that the source of the other file is trusted. In the event that determination module 106 identifies file 208 within a certain amount of time (e.g., one hour, one day, one week, etc.) after the related file with the trusted source was identified, determination module 106 may determine that the source of file 208 is also trusted.

In some embodiments, determination module 106 may determine that the source of file 208 is trusted based at least in part on determining that multiple users of computing devices 206(1)-(N) have analyzed and approved the source of file 208. For example, in the event that identification module 104 identified the source of file 208 by querying multiple users within the organization, determination module 106 may determine that the source of file 208 is trustworthy based on determining that a certain number of users (e.g., 10 reviewers, 20 reviewers, etc.) and/or a certain percentage of users (e.g., 95% of reviewers) within the polled users indicate that the source of file 208 is trustworthy.

In some examples, determination module 106 may determine that the source of file 208 is trusted based at least in part on identifying an instance of file 208 on at least a certain number of computing devices within the organization. For example, determination module 106 may determine that a file accessed by multiple computing devices within an organization may have been generated by a member of the organization and/or specifically designed to perform one or more tasks within the organization. As such, in the event that identification module 104 identified the source of file 208 by identifying instances of file 208 on computing devices 206(1)-(N), determination module 106 may determine that the source is trusted based on determining that instances of file 208 were found on at least a certain number (e.g., 50, 100, etc.) or a certain percentage (e.g., 25%, 50%, etc.) of computing devices 206(1)-(N).

In the example of FIG. 4, determination module 106 may determine that the source of file 208 is trusted in the event that file 208 is identified on at least four out of the nine computing devices within the organization that manages computing devices 406(1)-(9). In this example, determination module 106 may determine that the source of file 208 is trusted based on identifying instances of file 208 on five computing devices within computing devices 406(1)-(9).

Similarly, in some examples, determination module 106 may determine that the source of file 208 is trusted by determining that one or more instances of file 208 appeared on additional computing devices within a certain amount of time. For example, determination module 106 may determine that simultaneous appearances of a file on multiple computing devices within an organization are indicative of a benign organization-wide software update. As such, in the event that identification module 104 identified the source of file 208 at least in part by identifying instances of file 208 on computing devices 206(1)-(N) and the times at which the instances appeared on the computing devices, determination module 106 may determine that the source of file 208 is trusted based on determining that the instances appeared within a certain time frame (e.g., half an hour, two days, etc.) and/or with a certain frequency (e.g., one instance every minute).

In the example of FIG. 4, determination module 106 may determine that the source of file 208 is trusted in the event that instances of file 208 appear on at least two computing devices within computing devices 406(1)-(9) on the same day. In this example, identification module 104 may identify file 208 on computing device 406(5) on a certain day. Later during the same day, identification module 104 may determine that computing devices 406(1), 406(2), 406(7), and 406(9) also attempt to access instances of file 208. Therefore, determination module 106 may determine that the source of file 208 is trusted.

In some examples, determination module 106 may determine that the source of file 208 is trusted based on determining that file 208 has been installed on and/or stored within computing device 202 for at least a certain amount of time. For example, determination module 106 may determine that a file that has been benignly stored within a computing device for longer than a certain time period (e.g., one month, six months, etc.) is unlikely to be malicious. Additionally or alternatively, determination module 106 may determine that the source of file 208 is trusted based on determining that file 208 does not perform any suspicious behaviors within the organization. For example, determination module 106 may determine that the source of file 208 is trusted in the event that file 208 does not attempt to access registry run keys on computing device 202 and/or networks managed by the organization.

The systems described herein may determine whether the source of file 208 is trusted by implementing any one or combination of the analyses described above. In addition, the disclosed systems may combine one or more of the above-described analyses with additional analyses, such as traditional malware scans. For example, in the event that a traditional malware scan on file 208 is inconclusive or indicates that file 208 is malicious, the systems described herein may correct or override the result of the malware scan by determining that file 208 is a benign organization-specific file. In this way, the systems described herein may accurately identify files specifically created by and/or for an organization that may be incorrectly analyzed by malware scans that determine whether files originate from established, external sources.

Returning to FIG. 3, at step 308 one or more of the systems described herein may conclude, based on the source of the file being trusted within the organization, that the file is not malicious. For example, conclusion module 108 may, as part of computing device 202 in FIG. 2, conclude that file 208 is not malicious based on the source of file 208 being trusted within the organization that manages computing device 202.

The term "malicious file," as used herein, generally refers to any type or form of file that may compromise the integrity and/or security of a computing device and/or user of a computing device. In some examples, a malicious file may originate from an unverified source and/or a source that is known to distribute malicious files. Examples of malicious files include, without limitation, viruses, worms, Trojan horses, adware, spyware, rootkits, and/or other types of malware. In contrast, the term "not malicious file," as used herein, generally refers to any type or form of file that is known or presumed to be benign, legitimate, and/or useful to the operation of a computing device.

The systems described herein may determine that a file is not malicious in a variety of ways. In some examples, conclusion module 108 may conclude that because the source of file 208 is trusted, file 208 is unlikely to compromise the security and/or performance of computing device 202. Additionally or alternatively, conclusion module 108 may determine that file 208 is a necessary and/or important file for computing device 202 and/or a user of computing device 202. For example, conclusion module 108 may determine that file 208 contains an important organization-wide security update. In another example, conclusion module 108 may determine that file 208 was designed specifically for a member of the organization to perform his or her job.

The systems described herein may perform a variety of actions in response to the conclusion that file 208 is not malicious. In one example, security module 110 may allow computing device 202 to access file 208. Specifically, security module 110 may prevent computing device 202 from accessing file 208 before determining that file 208 is not malicious. After conclusion module 108 concludes that file 208 is not malicious, security module 110 may permit computing device 202 to download, upload, transfer, install, execute, and/or otherwise access file 208.

In another example, security module 110 may allow one or more of computing devices 206(1)-(N) to access file 208 in response to the conclusion that file 208 is not malicious. For example, security module 110 may add file 208 to a whitelist that identifies files allowed to be accessed by computing devices within the organization that manages computing device 202 and computing device 206(1)-(N). The whitelist may be maintained on each computing device within the organization and/or on a central server that monitors files accessed by computing devices within the organization. When a user of a computing device within the organization attempts to access an instance of file 208, the systems described herein may identify file 208 on the whitelist and automatically enable the user to access the file.

Additionally or alternatively, security module 110 may alert an administrator within the organization in response to the conclusion that file 208 is not malicious. For example, security module 110 may provide an update to an administrator that file 208 has been added to a whitelist. In another example, security module 110 may provide the administrator with an indication of which computing devices and/or how many computing devices within the organization have accessed file 208. While the systems described herein may eliminate or reduce the need of an administrator within an organization to manually approve or block files within the organization, an administrator may still be notified of additions to a whitelist and/or maintain control over files added to the whitelist.

As explained above, a computing device within an organization may identify a file that a user is attempting to access on the computing device. In response to identifying the file, the computing device may analyze the file's relationship with the organization in order to identify a source of the file. For example, the computing device may determine that the file was created by a member of the organization, that the file originated from an external software distributor, or that the file was accessed on multiple computing devices within the organization. The computing device may then determine whether the source is trusted within the organization. For example, the computing device may determine whether a user that created the file is an administrator within the organization, whether a software distributor that generated the file is trusted by the organization, or whether the file was accessed by more than a certain number or percentage of computing devices within the organization. In the event that the source of the file is trusted within the organization, the computing device may add the fill to a whitelist that identifies files allowed to be accessed by other computing devices within the organization.

Figure 5:
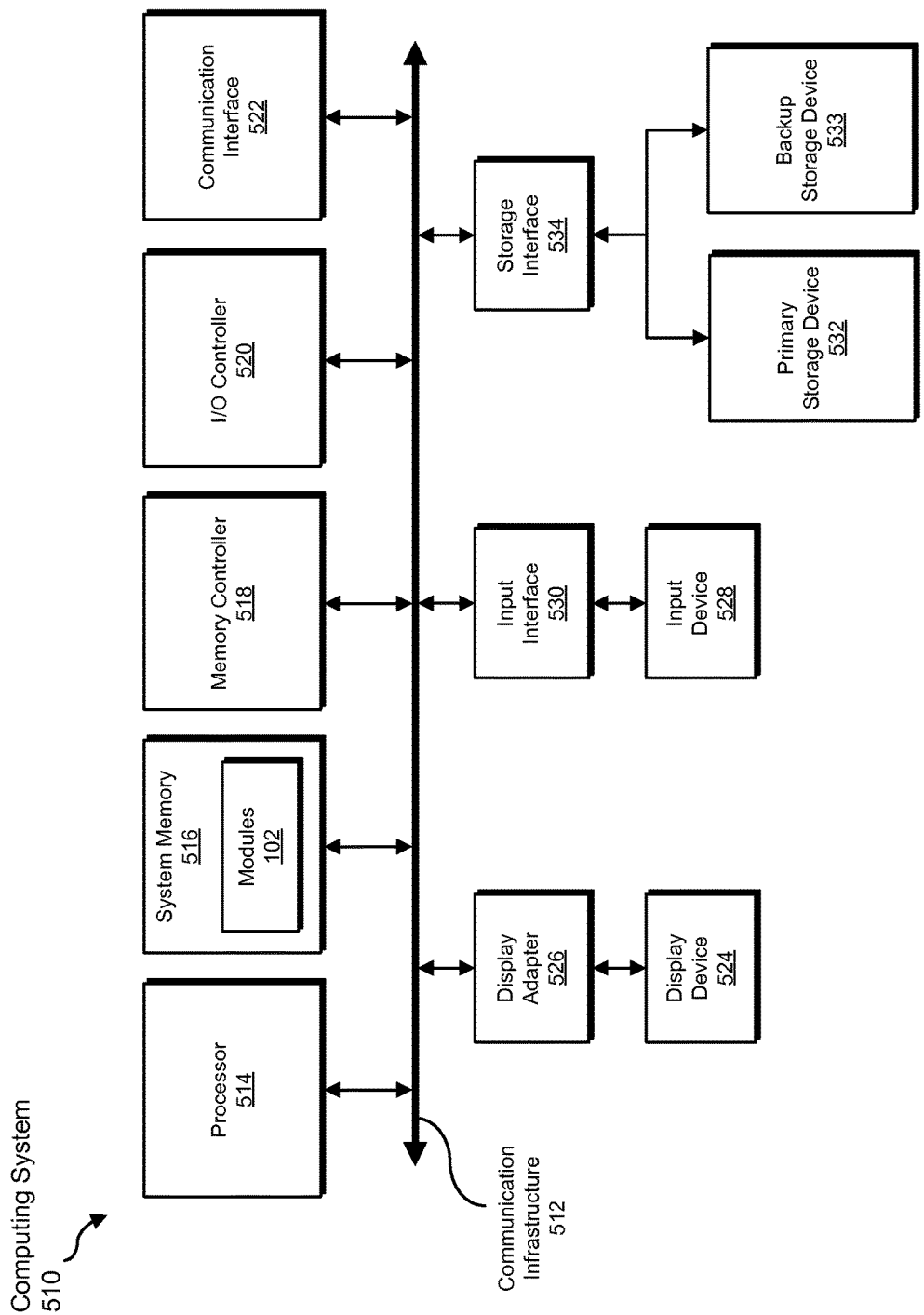
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an Application Specific Integrated Circuit (ASIC) adapted to implement one or more of the exemplary embodiments disclosed herein.

Figure 6:
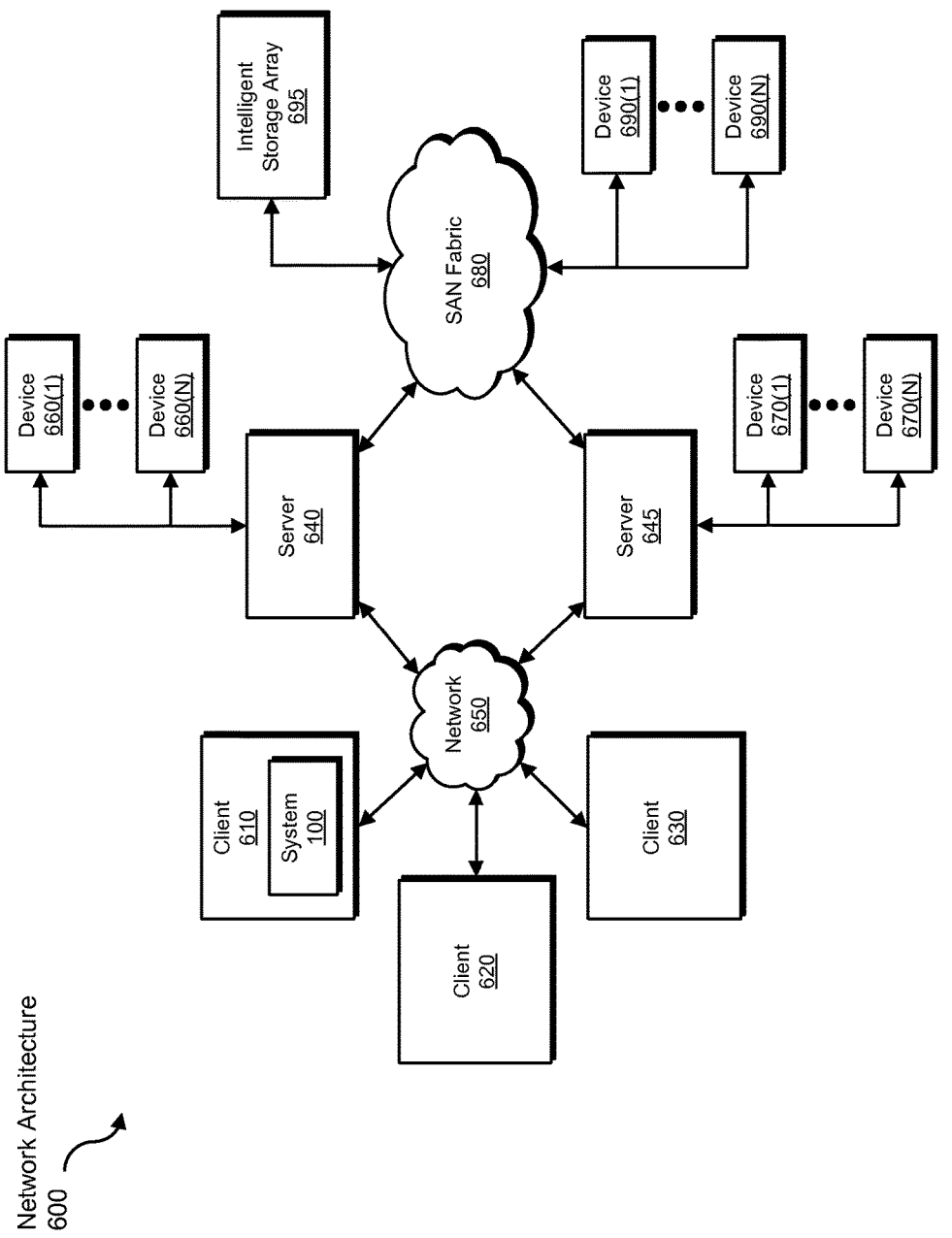
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for identifying non-malicious files on computing devices within organizations.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive a file to be transformed, transform the file into an indication that the source of the file is trusted, output a result of the transformation to a user that attempted to access the file, use the result of the transformation to allow the user to access the file, and store the result of the transformation in a server or database. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for identifying non-malicious files on computing devices within organizations, at least a portion of the method being performed by a first computing device comprising at least one processor, the method comprising:
   identifying a file on the first computing device within a plurality of computing devices managed by an organization;
   determining that an instance of the file appeared on a second computing device within the plurality of computing devices within a certain amount of time after identifying the file on the first computing device;
   determining that the file represents an organization-specific program created for internal use within the organization due at least in part to the file having appeared on the second computing device within the certain amount of time after identifying the file on the first computing device;
   determining, based at least in part on the file representing the organization-specific program, that the file is trusted within the organization;
   concluding, based on the file being trusted within the organization, that the file is not malicious; and
   protecting the security of the first computing device by:
      in response to concluding that the file is not malicious, adding the file to a whitelist of files that the first computing device is permitted to access; and
      preventing the first computing device from accessing files that are not included on the whitelist.

2. The method of claim 1, wherein identifying the file on the first computing device comprises detecting at least one attempt by a user of the first computing device to:
   install the file on the first computing device;
   download the file onto the first computing device; and
   execute the file on the first computing device.

3. The method of claim 1, further comprising:
   identifying a user within the organization that created the file;
   determining that the user is an administrator within the organization; and
   determining that the file represents the organization-specific program based on the user being the administrator within the organization.

4. The method of claim 3, wherein determining that the user is the administrator within the organization comprises:
   prior to identifying the file on the first computing device, creating a profile for the administrator that identifies applications associated with a computing device of the administrator; and
   determining that the file was generated by an application within the profile.

5. The method of claim 1, further comprising:
   identifying instances of the file on at least a predetermined number of computing devices within the plurality of computing devices; and
   determining that the file represents the organization-specific program based on the instance of the file being identified on the predetermined number of computing devices within the plurality of computing devices.

6. The method of claim 1, further comprising:
   determining that the file originated from a database of files managed by the organization;
   determining that that the database of files managed by the organization is trusted; and
   determining that the file represents the organization-specific program based on the database of files managed by the organization being trusted.

7. The method of claim 1, further comprising:
   determining that the file was generated by a software distributor external to the organization;
   determining that the software distributor is trusted; and
   determining that the file is trusted based on the software distributor being trusted.

8. The method of claim 1, further comprising:
   querying a plurality of users within the organization for an indication of the trustworthiness of the file;
   determining that at least a predetermined number of users within the organization indicate that the file is trustworthy; and
   determining that the file is trusted based on the predetermined number of users within the organization indicating that the file is trustworthy.

9. A system for identifying non-malicious files on computing devices within organizations, the system comprising:
an identification module, stored in memory, that:
identifies a file on a first computing device within a plurality of computing devices managed by an organization; and
determines that an instance of the file appeared on a second computing device within the plurality of computing devices within a certain amount of time after identifying the file on the first computing device;
a determination module, stored in memory, that:
determines that file represents an organization-specific program created for internal use within the organization due at least in part to the file having appeared on the second computing device within the certain amount of time after identifying the file on the first computing device; and
determines, based at least in part on the file representing the organization-specific program, that the file is trusted within the organization;
a conclusion module, stored in memory, that concludes, based on the file being trusted within the organization, that the file is not malicious;
a security module, stored in memory, that protects the security of the first computing device by:
in response to the conclusion that the file is not malicious, adding the file to a whitelist of files that the first computing device is permitted to access; and
preventing the first computing device from accessing files that are not included on the whitelist; and
at least one physical processor configured to execute the identification module, the determination module, the conclusion module, and the security module.

10. The system of claim 9, wherein:
the identification module further identifies a user within the organization that created the file; and
the determination module further determines that the file represents the organization-specific program by determining that the user is an administrator within the organization.

11. The system of claim 10, wherein the determination module determines that the user is the administrator within the organization by:
prior to identifying the file on the first computing device, creating a profile for the administrator that identifies applications associated with a computing device of the administrator; and
determining that the file was generated by an application within the profile.

12. The system of claim 9, wherein:
the identification module further analyzes files on the plurality of computing devices to identify instances of the file on the plurality of computing devices; and
the determination module further determines that the file represents the organization-specific program by identifying an instance of the file on at least a predetermined number of computing devices within the plurality of computing devices.

13. The system of claim 9, wherein:
the identification module further determines that the file originated from a database of files managed by the organization; and
the determination module further determines that the file represents the organization-specific program by determining that the database of files managed by the organization is trusted.

14. The system of claim 9, wherein:
the identification module further determines that the file was generated by a software distributor external to the organization; and
the determination module further determines that the file is trusted by determining that the software distributor is trusted.

15. The system of claim 9, wherein:
the identification module further queries a plurality of users within the organization for an indication of the trustworthiness of the file; and
the determination module further determines that the file is trusted by determining that at least a predetermined number of users within the organization indicate that the file is trustworthy.

16. A non-transitory computer-readable medium comprising one or more computer-executable instructions that, when executed by a first computing device comprising at least one processor, cause the first computing device to:
identify a file on the first computing device within a plurality of computing devices managed by an organization;
determine that an instance of the file appeared on a second computing device within the plurality of computing devices within a certain amount of time after identifying the file on the first computing device;
determine that the file represents an organization-specific program created for internal use within the organization due at least in part to the file having appeared on the second computing device within the certain amount of time after identifying the file on the first computing device;
determine, based on the file representing the organization-specific program, that the file is trusted within the organization;
conclude, based on the file being trusted within the organization, that the file is not malicious; and
protect the security of the first computing device by:
in response to concluding that the file is not malicious, adding the file to a whitelist of files that the first computing device is permitted to access; and
preventing the first computing device from accessing files that are not included on the whitelist.

* * * * *